(12) United States Patent
Allan et al.

(10) Patent No.: US 8,750,820 B2
(45) Date of Patent: *Jun. 10, 2014

(54) METHOD AND APPARATUS FOR SELECTING BETWEEN MULTIPLE EQUAL COST PATHS

(75) Inventors: David Allan, Ottawa (CA); Nigel Bragg, Weston Colville (GB); Jerome Chiabaut, Ottawa (CA)

(73) Assignee: Rockstar Consortium US LP, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/589,372

(22) Filed: Aug. 20, 2012

(65) Prior Publication Data
US 2012/0307832 A1    Dec. 6, 2012

Related U.S. Application Data

(63) Continuation of application No. 12/574,872, filed on Oct. 7, 2009, now Pat. No. 8,248,925.

(60) Provisional application No. 61/240,420, filed on Sep. 8, 2009, provisional application No. 61/246,110, filed on Sep. 26, 2009.

(51) Int. Cl.
*H04M 11/00* (2006.01)

(52) U.S. Cl.
USPC .......................................................... 455/403

(58) Field of Classification Search
USPC ............... 370/229, 235, 238, 238.1; 455/403, 455/422.1, 445
See application file for complete search history.

(56) References Cited

U.S. PATENT DOCUMENTS

| | | | |
|---|---|---|---|
| 6,633,544 B1 | 10/2003 | Rexford et al. | |
| 6,728,779 B1 * | 4/2004 | Griffin et al. ................. | 709/239 |
| 6,928,484 B1 * | 8/2005 | Huai et al. .................... | 709/239 |
| 7,719,960 B2 * | 5/2010 | Atlas et al. .................... | 370/222 |
| 7,830,786 B2 * | 11/2010 | Atlas et al. .................... | 370/217 |
| 7,903,573 B2 * | 3/2011 | Singer et al. .................. | 370/252 |
| 7,911,944 B2 * | 3/2011 | Chiabaut et al. ............. | 370/229 |
| 2001/0038612 A1 * | 11/2001 | Vaughn et al. ................ | 370/256 |
| 2003/0193898 A1 | 10/2003 | Wong et al. | |

(Continued)

OTHER PUBLICATIONS

European Search Report for European Patent Application No. 10814836.2, mailed Mar. 27, 2013, 5 pages.

(Continued)

*Primary Examiner* — Fan Ng
(74) *Attorney, Agent, or Firm* — Withrow & Terranova, PLLC (57) ABSTRACT

Each equal cost path is assigned a path ID created by concatenating an ordered set of link IDs which form the path through the network. The link IDs are created from the node IDs on either set of the link. The link IDs are sorted from lowest to highest to facilitate ranking of the paths. The low and high ranked paths are selected from this ranked list as the first set of diverse paths through the network. Each of the link IDs on each of the paths is then renamed, for example by inverting either all of the high node IDs or low node IDs. After renaming the links, new path IDs are created by concatenating an ordered set of renamed link IDs. The paths are then re-ranked and the low and high re-ranked paths are selected from this re-ranked list as the second set of diverse paths.

23 Claims, 7 Drawing Sheets

(56) References Cited

U.S. PATENT DOCUMENTS

| | | |
|---|---|---|
| 2004/0032832 A1 | 2/2004 | Desai et al. |
| 2005/0073958 A1* | 4/2005 | Atlas et al. .................... 370/238 |
| 2005/0088965 A1* | 4/2005 | Atlas et al. .................... 370/216 |
| 2007/0177506 A1* | 8/2007 | Singer et al. ................... 370/235 |
| 2008/0049622 A1 | 2/2008 | Previdi et al. |
| 2008/0123533 A1 | 5/2008 | Vasseur et al. |
| 2009/0168768 A1* | 7/2009 | Chiabaut et al. .............. 370/389 |
| 2011/0007629 A1* | 1/2011 | Atlas et al. .................... 370/225 |
| 2011/0044351 A1* | 2/2011 | Punati et al. ................... 370/408 |
| 2011/0060844 A1* | 3/2011 | Allan et al. .................... 709/241 |
| 2011/0128857 A1* | 6/2011 | Chiabaut et al. .............. 370/238 |
| 2011/0216769 A1* | 9/2011 | Lakshmanan et al. ........ 370/392 |

OTHER PUBLICATIONS

International Preliminary Report on Patentability for PCT/CA2010/001388 issued Mar. 13, 2012, 6 pages.

International Search Report for PCT/CA2010/001388 mailed Dec. 2, 2010, 2 pages.

Notice of Allowance for U.S. Appl. No. 12/574,872 mailed Apr. 11, 2012, 5 pages.

Non-final Office Action for U.S. Appl. No. 12/574,872 mailed Dec. 28, 2011, 5 pages.

* cited by examiner

Figure 3A

Path #1 from 1:8
Links: 1-4, 2-4, 2-8

Figure 3B

Path #2 from 1:8
Links: 1-4, 3-4, 3-8

Figure 3C

Path #3 from 1:8
Links: 1-5, 2-5, 2-8

Figure 3D

Path #4 from 1:8
Links: 1-5, 3-5, 3-8

Figure 3E

Path #5 from 1:8
Links: 1-5, 5-7, 7-8

METHOD AND APPARATUS FOR SELECTING BETWEEN MULTIPLE EQUAL COST PATHS

CROSS-REFERENCE TO RELATED APPLICATIONS

This application is a continuation of co-pending U.S. patent application Ser. No. 12/574,872, filed on Oct. 7, 2009, entitled METHOD AND APPARATUS FOR SELECTING BETWEEN MULTIPLE EQUAL COST PATHS, which claims priority to U.S. Provisional Patent Application No. 61/240,420, filed on Sep. 8, 2009, entitled ENHANCED SYMMETRIC TIE BREAKING ALGORITHMS, and to U.S. Provisional Patent Application No. 61/246,110, filed on Sep. 26, 2009, entitled ENHANCED SYMMETRIC TIE BREAKING ALGORITHMS, each of which is hereby incorporated herein by reference.

TECHNICAL FIELD

The present invention relates to communication networks and, more particularly, to a method and apparatus for selecting between multiple equal cost paths.

BACKGROUND

Data communication networks may include various computers, servers, nodes, routers, switches, bridges, hubs, proxies, and other network devices coupled together and configured to pass data to one another. These devices will be referred to herein as "network elements." Data is communicated through the data communication network by passing protocol data units, such as data frames, packets, cells, or segments, between the network elements by utilizing one or more communication links. A particular protocol data unit may be handled by multiple network elements and cross multiple communication links as it travels between its source and its destination over the network.

The various network elements on the communication network communicate with each other using predefined sets of rules, referred to herein as protocols. Different protocols are used to govern different aspects of the communication, such as how signals should be formed for transmission between network elements, various aspects of what the protocol data units should look like, how packets should be handled or routed through the network by the network elements, and how information associated with routing information should be exchanged between the network elements. Networks that use different protocols operate differently and are considered to be different types of communication networks. A given communication network may use multiple protocols at different network layers to enable network elements to communicate with each other across the network.

In packet-forwarding communications networks, a node can learn about the topology of the network and can decide, on the basis of the knowledge it acquires of the topology, how it will route traffic to each of the other network nodes. Frequently, the main basis for selecting a path is path cost, which can be specified in terms of a number of hops between nodes, or by some other metric such as bandwidth of links connecting nodes, or both. Open Shortest Path First (OSPF) and Intermediate System-to-Intermediate System (IS-IS) are widely used link-state protocols which establish shortest paths based on each node's advertisements of path cost.

Various shortest path algorithms can be used to determine if a given node is on the shortest path between a given pair of bridges. An all-pairs shortest path algorithm such as Floyd's algorithm or Dijkstra's single-source shortest path algorithm can be implemented by the nodes to compute the shortest path between pairs of nodes. It should be understood that any other suitable shortest path algorithm could also be utilized. The link metric used by the shortest path algorithm can be static or dynamically modified to take into account traffic engineering information. For example, the link metric can include a measure of cost such as capacity, speed, usage and availability.

There are situations where multiple equal cost paths exist through a network between a given pair of nodes. ISIS and OSPF use a simplistic uni-directional tie-breaking process to select between these multiple equal-cost paths, or just spread traffic across the equal-cost paths. The spreading algorithms are not specified and can vary from router to router. Alternatively, each router may make a local selection of a single path, but without consideration of consistency with the selection made by other routers. Consequently, in either case, the reverse direction of a flow is not guaranteed to use the path used by the forward direction. This is sufficient for unicast forwarding where every device will have a full forwarding table for all destinations and promiscuously accepts packets to all destinations on all interfaces. However, this does not work well in other situations such as multicast routing, when consistent decisions must be made, and when bi-directional symmetry is required to enable the actual forwarding paths in a stable network to exhibit connection oriented properties.

Multicast routing protocols such as Multicast Open Shortest Path First (MOSPF) depend on each router in a network constructing the same shortest path tree. For this reason, MOSPF implements a tie-breaking scheme based on link type, LAN vs. point-to-point, and router identifier, to ensure that identical trees are produced. However, basing the tie-breaking decision on the parent with the largest identifier implies that the paths used by the reverse flows may not be the same as the paths used by the forward flows.

There is a requirement in some emerging protocols, such as Provider Link State Bridging (PLSB) which is being defined by the Institute of Electrical and Electronics Engineers (IEEE) as proposed standard 802.1aq, to preserve bi-directional congruency of forwarding across the network for both unicast and multicast traffic, such that traffic will use a common path in both forward and reverse flow directions. Accordingly, it is important that nodes consistently arrive at the same decision when tie-breaking between equal-cost paths and that the tie breaking process be independent of which node is the root for a given computation. Furthermore, it is desirable that a node can perform the tie-breaking with a minimum amount of processing effort.

Generally, any tie-breaking algorithm should be complete, which means that it must always be able to choose between two paths. Additionally, the tie-breaking algorithm should be commutative associative, symmetric, and local. These properties are set forth below in Table I:

TABLE I

| Requirement | Description |
| --- | --- |
| Complete | The tie-breaking algorithm must always be able to choose between two paths |
| Commutative | tiebreak(a, b) = tiebreak(b, a) |
| Associative | tiebreak(a, tiebreak(b, c)) = tiebreak(tiebreak(a, b), c) |
| Symmetric | tiebreak(reverse(a), reverse(b)) = reverse(tiebreak(a, b)) |
| Local | tiebreak(concat(a, c), concat(b, c)) = concat(tiebreak(a, b), c) |

The essence of a tie-breaking algorithm is to always 'work'. No matter what set of paths the algorithm is presented with, the algorithm should always be able to choose one and only one path. First and foremost, the tie-breaking algorithm should therefore be complete. For consistent tie-breaking, the algorithm must produce the same results regardless of the order in which equal-cost paths are discovered and tie-breaking is performed. That is, the tie-breaking algorithm should be commutative and associative. The requirement that tie-breaking between three paths must produce the same results regardless of the order in which pairs of paths are considered is not as obvious and yet it is absolutely necessary for consistent results as equal-cost paths are discovered in a different orders depending on the direction of the computation through the network. The tie-breaking algorithm must also be symmetric, the tie-breaking algorithm must produce the same result regardless of the direction of the path: the shortest path between two nodes A and B must be the reverse of the shortest path between B and A.

Finally, locality is a very important property of shortest paths that is exploited by routing systems. The locality property simply says that: a sub-path of a shortest path is also a shortest path. This seemingly trivial property of shortest paths has an important application in packet networks that use destination-based forwarding. In these networks, the forwarding decision at intermediate nodes along a path is based solely on the destination address of the packet, not its source address. Consequently, in order to generate its forwarding information, a node needs only compute the shortest path from itself to all the other nodes and the amount of forwarding information produced grows linearly, not quadratically, with the number of nodes in the network. In order to enable destination-based forwarding, the tie-breaking algorithm must therefore preserve the locality property of shortest paths: a sub-path of the shortest path selected by the tie-breaking algorithm must be the shortest path selected by the tie-breaking algorithm.

Considerations of computational efficiency put another seemingly different requirement on the tie-breaking algorithm: the algorithm should be able to make a tie-breaking decision as soon as equal-cost paths are discovered. For example, if an intermediate node I is connected by two equal-cost paths, p and q, to node A and by another pair of equal-cost paths, r and s, to node B, there are therefore four equal-cost paths between nodes A and B, all going through node I: p+r, p+s, q+r, q+s.

The equal-cost sub-paths between A and I (p and q) will be discovered first when computing a path between nodes A and B. To avoid having to carry forward knowledge of these two paths, the tie-breaking algorithm should be able to choose between them as soon as the existence of the second equal-cost shortest sub-path is discovered. The tie-breaking decisions made at intermediate nodes will ultimately affect the outcome of the computation. By eliminating one of the two sub-paths, p and q, between nodes A and I, the algorithm removes two of the four shortest paths between nodes A and B from further consideration. Similarly, in the reverse direction, the tie-breaking algorithm will choose between sub-paths r and s (between nodes B and I) before making a final determination on the path between A and I. These local decisions must be consistent with one another and, in particular, the choice between two equal-cost paths should remain the same if the paths are extended to a subsequent node in the network.

It turns out that the symmetry and locality conditions are both necessary and sufficient to guarantee that the tie-breaking algorithm will make consistent local decisions, a fact that can be exploited to produce very efficient implementations of the single-source shortest path algorithm in the presence of multiple equal-cost shortest paths.

The list of requirements set out in Table 1 is not intended to be exhaustive, and there are other properties of shortest paths that could have been included in Table 1. For example, if a link which is not part of a shortest path is removed from the graph, the shortest path selection should not be affected. Likewise, the tie-breaking algorithm's selection between multiple equal-cost paths should not be affected if a link which is not part of the selected path is removed from the graph representing the network, even if this link is part of some of the equal-cost paths that were rejected by the algorithm.

Many networking technologies are able to exploit a plurality of paths such that they are not confined to a single shortest path between any two points in the network. This can be in the form of connectionless networks whereby the choice of next hop into a plurality of paths can be arbitrary at every hop, and has no symmetry requirement, or can be strictly connection oriented where the assignment to an end to end path is confined to the ingress point to the network. Ethernet and in particular the emerging 802.1aq standard being an example where there is a requirement for both symmetry and connection oriented behavior, and the dataplane can support a plurality of paths between any two points in the network. Ethernet achieves this by being able to logically partition the filtering database by VLAN such that a unique path may exist per VLAN. The challenge is to effectively exploit the available connectivity by instantiating connectivity variations in each VLAN and maximizing the diversity of the path set such that a minimum number of path variations fully exploits the network. The ratio of path variations required to exploit the network vs. the number of possible unique paths that actually exist is called the dilation ratio, the desirable goal being to minimize this ratio as it minimizes the amount of state and computation associated with fully exploiting the network.

Many techniques have been tried to increase the path diversity where multiple equal cost paths exist between a pair of nodes while explicitly seeking to maintain the properties outlined in table 1 above. U.S. Patent Application Publication No. 2009/0168768 provides one technique, and extensions to this have been attempted as well. For example, algorithmic manipulation of node IDs has been found to work, but does not increase the amount of path diversity significantly. For example, link utilization for an 8×4 fully meshed node array ranged from 63% to 67% using node ID manipulation. Additionally, where there are fewer than four paths, attempting to rank four unique paths on a set of node IDs breaks down such that the second highest path ends up being equal to the lowest, or the second lowest instead of exploring overlapping permutations. Further, the size of the node identifier and whether the node ID space is sparse or dense has little effect.

Another technique that has been tried is to distribute paths on the basis of maximizing load diversity. This technique has been found not to work, because it does not produce an acyclic planar graph, by which is meant that it requires more than one path to a given node in a single shortest path tree. Additionally, this technique requires advance knowledge of future computational results as the network is traversed further from the computing node. In essence, there is nothing to join the gap when working from either end into the middle of the network.

Yet another technique that has been tried is to select specific well known rankings (lowest, highest, next lowest, next highest . . . ). This works for two paths (high/low) but breaks down when it is extended to selection of larger numbers of paths. This technique fails because the intermediate nodes cannot anticipate how the ranked set of paths they generate fare when combined with other nodes' ranked sets at the next hop, and so the locality property is lost. As a consequence, the fragments of the shortest path ranked by the parent will be discontiguous with the path expected by the child. Further, there is no guarantee that path rankings other than low and high at the children nodes will produce an acyclic tree. Additionally, selecting the second highest, second lowest, etc., produces dependencies, since a failure of the highest path or lowest path will affect all paths ranked off that path. And finally, even postulating such an algorithm could be made to work, it would lose the property of being able to resolve portions of the shortest path as identified, all state needing to be carried forward as the Dijkstra computation progressed, significantly impacting the performance of the algorithm. As a result, the low and high rankings are the only reliable rankings that may be selected from a set of ranked paths. Thus, simply selecting additional rankings cannot be used to increase the path diversity when selecting more than two paths.

U.S. Patent Application Publication No. 2009/0168768 discloses one tie breaking process, the content of which is hereby incorporated herein by reference. Although the process described in this application works well, it would still be advantageous to provide another way to get good path distribution in the presence of multiple paths, to enable traffic to be spread across the available paths. Additionally, the distribution should preferably be an a feature of normal operation, and not require complicated network design, and minimize any explicit configuration by a network administrator.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter which is set forth by the claims presented below.

A method and apparatus for selecting between multiple equal cost paths enables multiple (more than two) paths to be selected from a plurality of equal cost paths using a distributed algorithm, with a significant degree of path diversity, and while preserving important key properties. Namely, the extended algorithm achieves symmetry—the result will be the same regardless of the direction of computation across the graph. The proposed algorithm also provides downstream congruency, such that any portion of the shortest path for a given ranking is also the shortest path. Finally, this algorithm produces acyclic shortest path trees.

According to an embodiment of the invention, the node IDs that connect to each link in the network are used to create link IDs. For example the node IDs at either end of a link may be used to create a link ID. Each path through the network is given a path ID by concatenating an ordered set of link IDs which form the path through the network. The link IDs are sorted from lowest to highest when creating the path ID to facilitate ranking of the paths. The low and high ranked paths are selected from this ranked list as the first set of diverse paths through the network. It should be trivial to observe that variations of this that will have similar properties, such as ordering the node IDs in the link IDs as high-low instead of low-high, or sorting the path IDs high to low prior to ranking could be equally valid instantiations of the algorithm providing all computing nodes in the network were configured to use a common variation.

To select additional paths, the manner in which the links are named is changed, to enable the paths to be assigned new path IDs and to facilitate a ranking that would have advantageous diversity properties from the originally selected low and high paths. For example, the high node ID associated with each link may be inverted so that new link IDs may be created using the original low node ID and inverted high node ID. For example, the node IDs may be inverted by subtracting them from 2^16, for the case that node IDs are assigned in the range 1 to (2^16−1), or XORing the node IDs with 0xffff or some similar value. These new link IDs are used to create new path IDs (ordered list of concatenated link IDs) which are then ranked and the low and high ranking paths from the re-ranked set of paths are taken as the second pair of paths. Again variations can be postulated such as applying the transformation to the low node ID in the link ID that are equally valid.

The sorted concatenation of node IDs to construct link IDs is unique, so each path ID through the network is unique, and whatever transforms are applied to either of the node IDs in the link ID needs to preserve this uniqueness, hence cannot be "lossy" and must be uniformly applied, a simple bit inversion being an example that meets this requirement. Hence, for example, the sorted concatenation of low node IDs and inverted higher node IDs (e.g. nodeA concatenated with Inverse(nodeB) where nodeA<nodeB) is also unique and simply leads to a re-ranking of the paths. Thus, both a first low/high path ranking and second low/high path ranking with significant diversity from the first can be obtained to increase the degree of link utilization in the network. Further, the consequences of a path failure do not cascade since there is no relative ranking—the failure of a link shared by one or more previously selected paths will remove those paths from consideration, but will not affect the rankings of the remainder and hence the routing of the remaining viable paths selected with the technique.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

Figure 1:
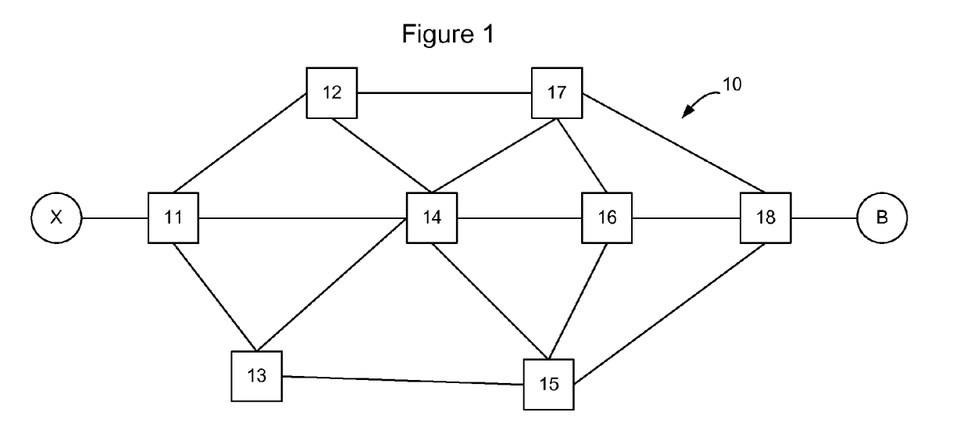
FIG. 1 is a functional block diagram of an example communication network in which an embodiment of the invention may be implemented.
Figure 2:
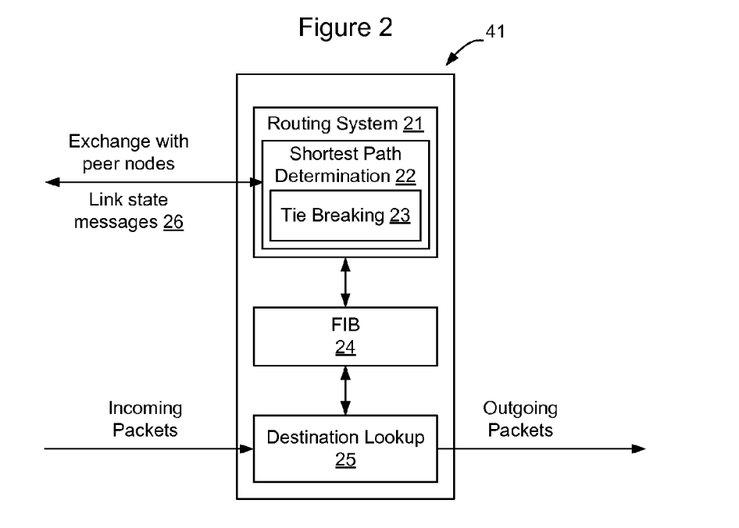
FIG. 2 is a functional block diagram of an example node of the communication network of FIG. 1.

FIG. 1 shows an example of a link state protocol controlled Ethernet network 10 in which the invention can be implemented, and FIG. 2 shows a functional block diagram of one of the nodes which may be used to implement an embodiment of the invention. Nodes (also called bridges, or bridging nodes) 11-18 forming the mesh network of FIG. 1 exchange link state advertisements (messages) 26 with one another. This is achieved via the well understood mechanism of a link state routing system. A routing system module 21 exchanges information 26 with peer nodes in the network regarding the network topology using a link state routing protocol. This exchange of information allows the nodes to generate a synchronized view of the network topology. At each node, a Shortest Path Determination module 22 calculates a shortest path tree, which determines the shortest path to each other node. The shortest paths determined by module 22 are used to populate a Forwarding Information Base 24 with entries for directing traffic through the network.

As noted above, situations arise when there are multiple equal-cost paths through the network. In this instance, a tie-breaking module 23 selects one (or more) of the equal-cost paths in a consistent manner. In normal operation, packets are received at the node and a destination lookup module 25 determines, using the FIB 24, the port (or multiple ports in the case of multicast distribution) over which the received packet should be forwarded. If there is no valid entry in the FIB 24 then the packet may be discarded. It will be appreciated that the modules shown in FIG. 2 are for illustrative purposes only and may be implemented by combining or distributing functions among the modules of a node as would be understood by a person of skill in the art.

There are situations where complete node diversity is impossible or limited, but link diversity between the paths is possible Likewise, in data center applications, where fat-tree network architectures are often deployed, frequently more than two equal cost paths are available. To avoid overloading particular links, it is desirable to spread the traffic across all of the available paths to "shake up" the link arrangements and increase the degree of link diversity between paths. Hence, in these and other situations, it is desirable to select multiple (more than two) of the equal cost paths through the network to be used to forward traffic between a pair of nodes.

According to an embodiment of the invention, link IDs are constructed from the ordered concatenation of node IDs, and path IDs are constructed from the ordered concatenation of link IDs such that path IDs can be ranked. This ranking is used to implement an initial path selection in a tie breaking algorithm by selecting the lowest and highest of these ranked paths.

In one embodiment, the node IDs that connect to each link in the network are used to create link IDs. The link IDs, in this context, are generated by concatenating the node IDs on either end of the link. The concatenation of node IDs is implemented such that the node IDs are ranked within the link ID, so in one example, lowest node ID is first with the higher node ID second. Thus, if a link extends from node 48 to node 23, the link ID will be (23, 48), not (48, 23). Sorting the node IDs before ranking enables a common result to be computed regardless of the order of computation. A set of end to end paths through the network are then generated and the link IDs of the links on those paths are concatenated to form path IDs. The link IDs in the path IDs are similarly sorted, then the Path IDs are ranked and the high/low path IDs are selected as the first pair of diverse paths.

Then, to obtain a second path selection, the link IDs that were used to create the path IDs are renamed, by applying a transformation universally to one of the two node IDs used to create the link IDs. The transformation is always applied to the second (i.e. least significant) node ID in the concatenated node IDs forming the link ID. The revised link IDs are used to create new Path IDs for each of the equal cost paths. The new path IDs are ranked and a second set of paths are selected by taking the lowest and highest ranked of the transformed path IDs to produce a second low-high ranked path pair. This second low-high ranked path pair has a significant degree of link diversity from the original selected path pair but will not be guaranteed to be fully link diverse as there will still be dependencies on the arrangement of node IDs. Other transformations of the link IDs may also be used to generate further diverse path permutations in densely meshed networks. However, it should be noted that a common transformation of both low and high node IDs in the link IDs is too highly correlated to produce significant diversity.

Contrasting the approach with simple repeated random assignment of node IDs illustrates the benefits of the approach. If random node IDs are assigned repeatedly and, and the low path ID is taken, the result that is obtained can be directly predicted by the birthday problem equation. $1-(1-1/n)**k$. (n=links, k=number of paths actually used). So (for example) in a fat tree with dual uplinks, there is typically 4 links at any level of the hierarchy. Accordingly, on average, this process will use approximately 68% of the links if Equal Cost Multi-Tree (ECMT) with 4 trees is used. Improving this to fully utilize the network requires significant dilation of the number of equal cost tree variations explored, and the standard deviation of link utilization varies considerably.

The preferred algorithm has the desirable property in that the simple inversion of the high node ID in the link IDs the transformation only considers the relative rankings of node IDs, and is not sensitive to how node IDs are allocated (contiguous, random, ranges etc.). So the performance would be immune to administrative practice and would easily facilitate design rules for circumstances where it was desired to administer the network behavior.

The preferred algorithm has the further desirable property that the degree of path diversity achieved is independent of the number of hops traversed by the set of equal cost paths. Hence the amount of diversity does not degrade as the network diameter increases.

A small degree of administration applied to a highly symmetric hierarchical network can further enhance the degree of diversity this algorithm achieves. If the levels of the switching hierarchy are enumerated such that they can be identified as odd or even, and the IDs of either the odd or even rows promoted by a large amount, many of the circumstances that cause the algorithm to fail to select link diverse paths are eliminated. For example, if the maximum node ID value is $2^-1$, adding $2^16$ to the node IDs of all nodes at odd levels of the hierarchy causes the order of the nodes in the path to alternate between local minima and local maxima. If there is more than one path possibility that transits a local minima, all nodes which the local minima is connected to at the next switching level are guaranteed to be commonly a local maxima, and inverting the node ID will invert the rankings, ensuring a different link is used for the next path selected.

Figure 3A:
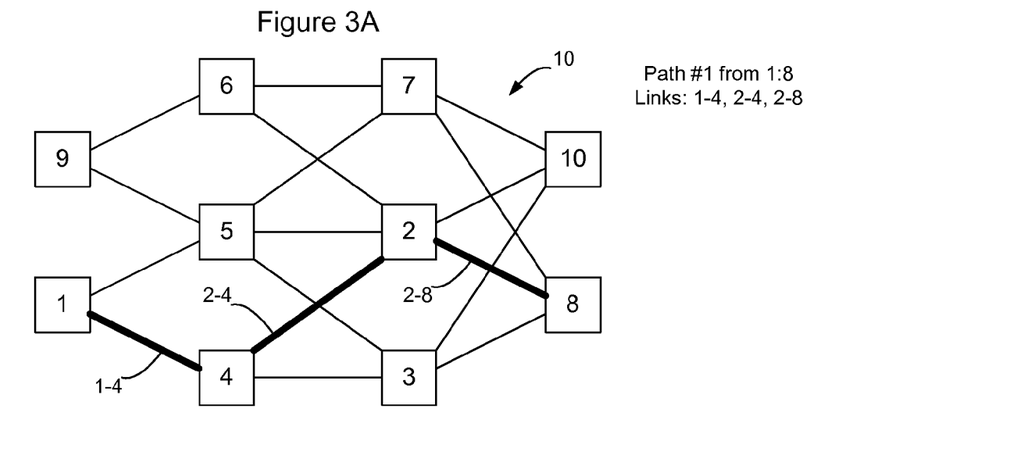
FIGS. 3A-3E show example equal cost paths between a pair of nodes in a reference network.

FIGS. 3A-3E show a set of five equal cost paths through an example reference network, and FIGS. 4, and 5A-B and 6, show a process of selecting a set of paths between a pair of nodes on the example reference network. In FIGS. 3A-3E, the same reference network is shown with each of the figures showing one of the five different equal cost paths between nodes 1 and 8. For example, FIG. 3A shows a first path through an example reference network 30 between nodes 1 and 8, and including nodes 1, 4, 2, and 8. The links on this path will be named by concatenating the node IDs on either end of the link. Thus, a first link from node 1 to node 4 will be link 1-4, the next link is link 2-4, and the final link is link 2-8. Note that by convention, in constructing the concatenated node IDs, the lower node ID is always first. Another convention (e.g. always having the higher node ID first) may be adopted as well as long as all nodes on the network use the same convention.

Figure 3B:
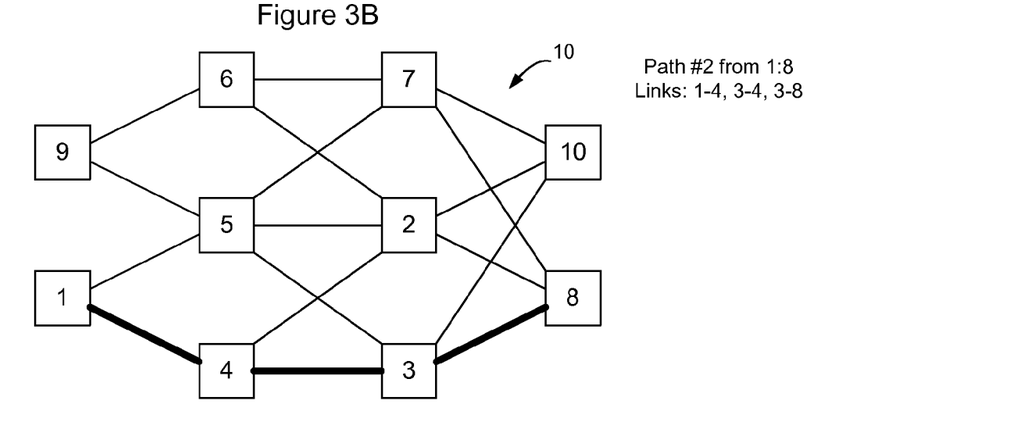
Figure 3C:
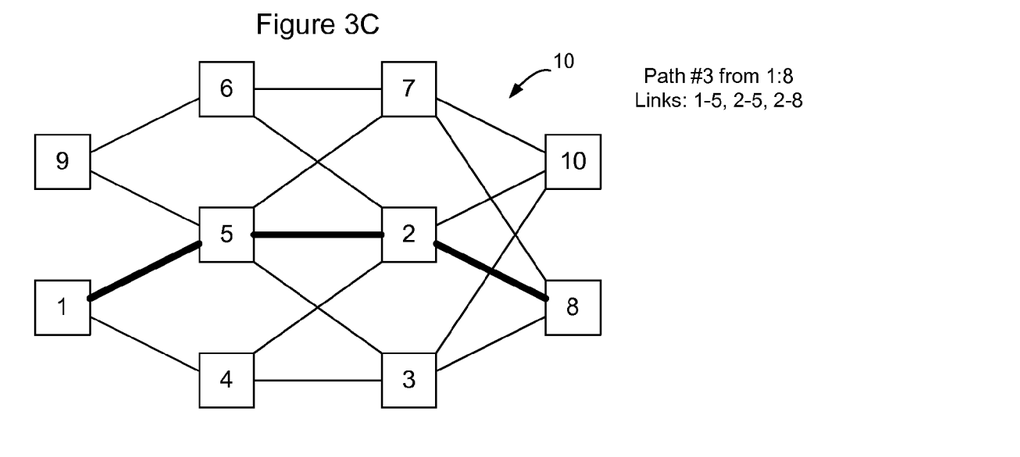
Figure 3D:
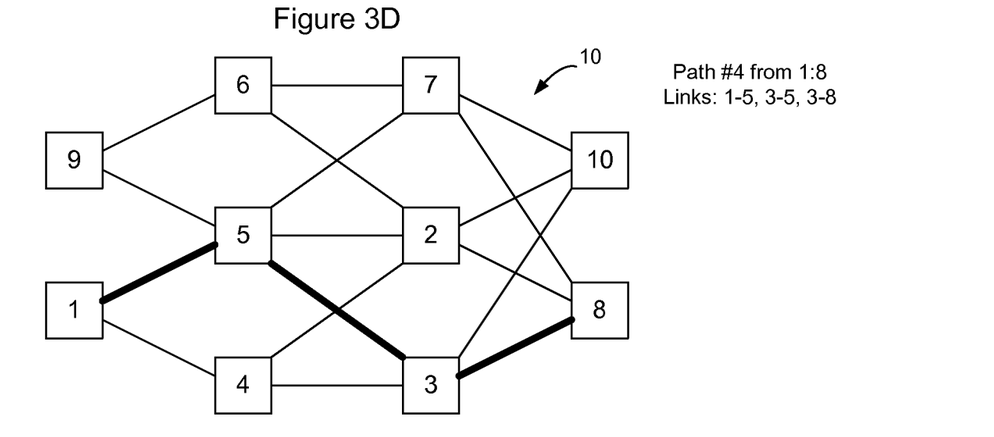
Figure 3E:
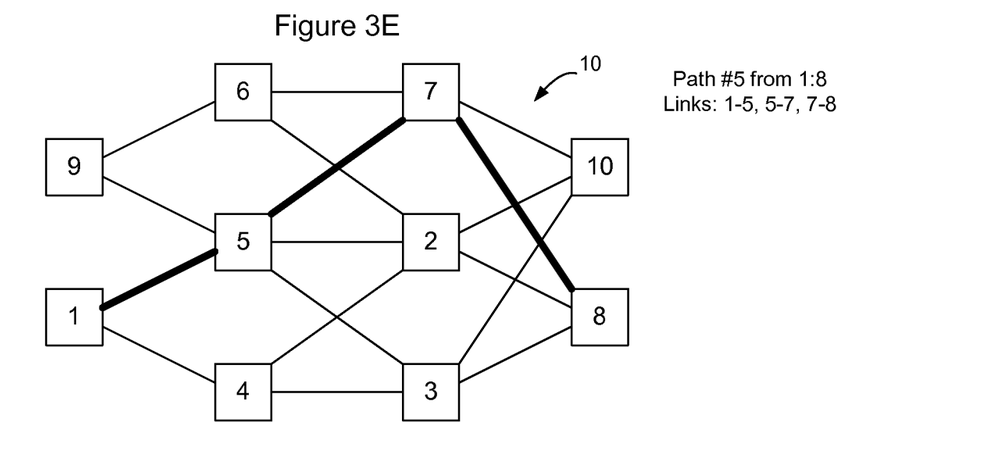

FIGS. 3B-3E show the four other alternative equal cost paths between nodes 1 and 8. Specifically, FIG. 3B shows a path through nodes 1, 4, 3, and 8. This path is named using link IDs 1-4, 3-4, and 3-8. FIG. 3C shows a path through nodes 1, 5, 2, and 8. This path is named using link IDs 1-5, 2-5, and 2-8. FIG. 3D shows a path through nodes 1, 5, 3, and 8. This path is named using link IDs 1-5, 3-5, and 3-8. FIG. 3E shows a path through nodes 1, 5, 7, and 8. This path is named using link IDs 1-5, 5-7, and 7-8.

Figure 4:
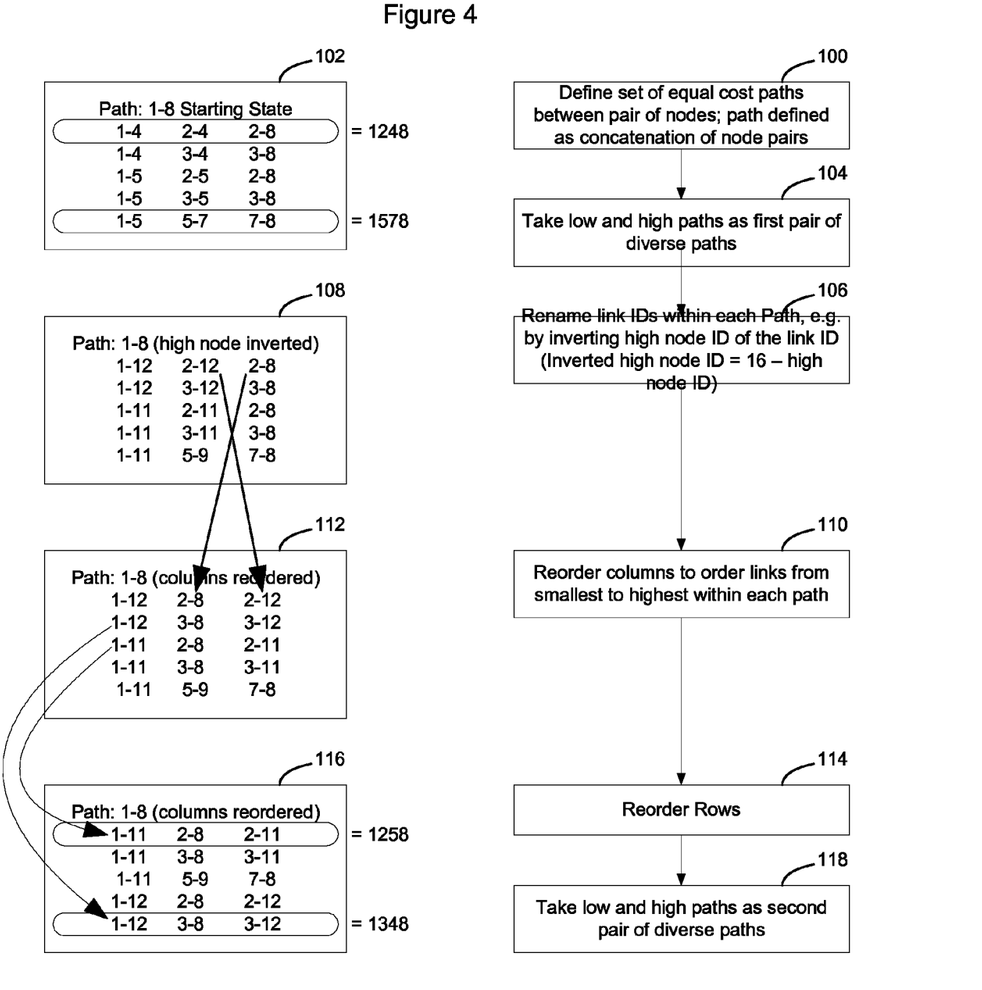
FIG. 4 shows an example flow chart of a process of selecting between multiple equal cost paths and application of the process to the equal cost paths shown in FIGS. 3A-3E at the end nodes according to an embodiment of the invention.

FIG. 4 shows a process of selecting two sets of diverse paths between a pair of nodes in the network. The process is shown on the right-hand side, and an example application of the process to the network of FIGS. 3A-3E is shown on the left-hand column in this figure. The numbers in the example shown in the boxes forming the left-hand column are taken from the reference network and example paths shown in FIGS. 3A-3E.

Initially, the shortest path routing system will find a set of equal cost paths between a pair of nodes (100). The paths identifiers (IDs) are constructed as a sorted list of link IDs 102. As shown in FIG. 4, the sorted path IDs correspond to the paths shown in FIGS. 3A-3E. The possible equal cost paths are ranked and the ranked path IDs are used to select a first set of two diverse paths. Specifically, the low and high ranked paths are selected from this ranked list (104). In the illustrated example, the low path is path 1248 (FIG. 3A) and the high path is 1578 (FIG. 3E). These selected paths have been circled in box 102.

This ranking process enables two diverse paths to be selected. To select additional paths, according to an embodiment of the invention, the link IDs used to create the paths are changed (referred to herein as re-naming the links) to enable a new path ID to be assigned to the same path. For example, in one embodiment the highest node ID in each link ID is inverted (106). This enables the link IDs to be re-named while ensuring that each link ID remains unique within the network. The way in which this may be applied to the example network is shown in the example by box 108. For example, in path 1, link 1-4 has a high node with a node ID of 4. This node ID is inverted so that the link ID becomes 1-12. In the example shown in FIG. 4, the node inversion is performed by bitwise inversion or by subtracting them from a large enough value that the node IDs are still unique. For this example, the node IDs may be inverted by subtraction from 16. Other ways of inverting the node IDs may be used as well. For example the node IDs may be X-ORed with a particular value; if node IDs are assigned in the range 0 to 2^N−1, the appropriate particular value is also 2^N−1. Other ways of inverting the node IDs to re-name the links may be used as well. For example, although an embodiment was shown in which the high node ID was inverted, other embodiments may find other ways of renaming the links, such as by inverting the low node ID.

Once the links have been renamed (e.g. the high nodes have been inverted) the links within each path are sorted so that the paths IDs once again contain an ordered list of concatenated links. The concatenated links are ordered in this process such that the lowest links are first and the higher links are subsequently concatenated onto the lowest link. Thus, for example in box 108, after inversion path 1 contained links 1-12, 2-12 and 2-8. Since 2-8 is lower than 2-12, this path is re-ordered as shown in box 112 to enable path 1 to be expressed as a concatenation of links 1-12, 2-8 and 2-12. Each of the paths will be individually re-ordered to enable the new path identifier to have a concatenated set of links which is ordered from lowest link identifier to highest link identifier. Re-ordering the links facilitates ranking of the path, but may optionally be omitted where the ranking process is able to rank the paths using un-ordered sets of link IDs.

When the path IDs were first formed (100, 102) the individual link IDs were set such that each link ID had the lowest node ID first followed by the highest node ID. When the links are renamed (106, 108) and the highest node ID is inverted, this may cause some of the individual link IDs to have a higher node ID first and a lower node ID second. Note, in this regard, that the initial link IDs were created by always having the lower node ID first, concatenated with the higher node ID. Inverting the higher node ID may cause this normal order to be switched. However, after the inversion process the order of the node IDs associated with a particular link should not be changed even if this occurs, since doing so may cause the link to be no longer globally unique within the network.

Once new path IDs have been created for the paths by renaming the link IDs (106) associated with the path and rearranging the link IDs (110), the paths are re-sorted to re-rank the newly named paths (114). The result of this re-ordering step for the example is shown in box 116. As shown in this example, the path that had been the second lowest path ID during the initial ranking process has become the lowest path ID after renaming the links to create new path IDs. Likewise, the path that had been the third lowest path ID during the initial ranking has now become the highest ranked path. By taking the low and high paths in the revised path list, a second pair of diverse paths may be obtained (118).

The original sorted concatenation of node IDs is unique, so each path ID created using for a particular path through the network is unique. Likewise, nodeA concatenated with Inverse(nodeB) is also unique and simply leads to a re-ranking of the unique paths. Thus, both a first low/high pair and second low/high pair can be obtained to increase the amount of link usage on the network. If desired, a second renaming of the link IDs may be implemented, for example by inverting the low node ID instead of the high node ID, and the process may be repeated to find a third set of diverse paths through the network. Likewise, different rankings may be created by altering the inversion function used to rename the links when changing the path IDs.

As may be seen, the process of selecting subsequent sets of diverse paths does not depend on the original ranking. Hence, path failure does not cascade since there is no relative ranking—no path is selected solely because it was ranked relative to another path during a given ranking process. Thus, the failure of a link shared by one or more previously selected paths will remove those paths that include the link from consideration but will not affect the ranking order of the surviving paths, since the other paths were selected during other independent ranking operations. Stated differently, since each of the other paths were selected independently, the failure of a link on one of the selected paths will not affect selection of the other paths and, hence, the failure will not cascade to affect the other path selections.

Figure 5A:
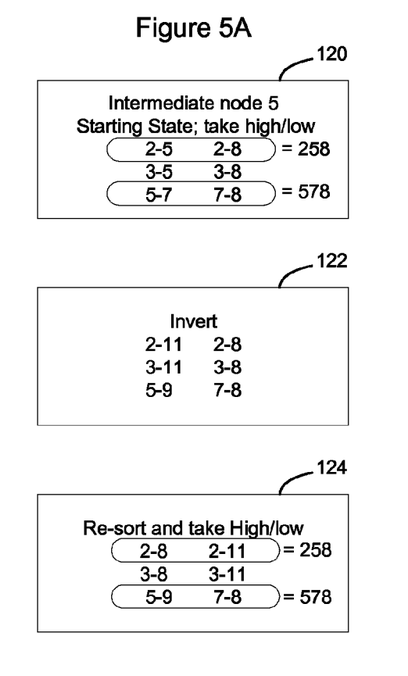
FIGS. 5A-5B show application of the process of FIG. 4 at intermediate nodes on the paths shown in FIGS. 3A-3E.
Figure 5B:
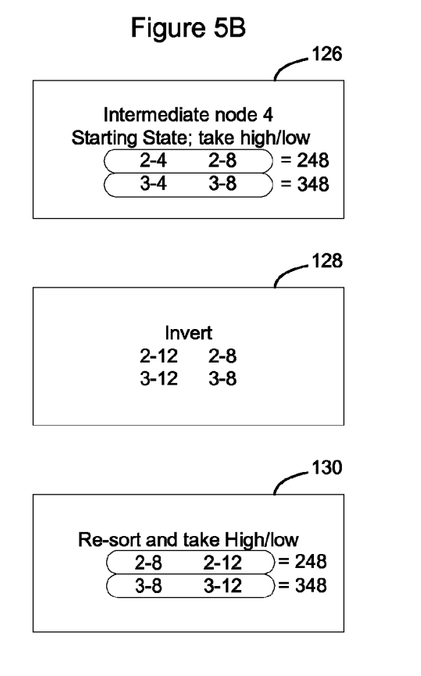
Figure 6:
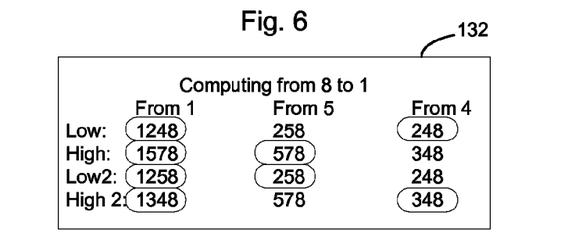
FIG. 6 illustrates the congruency of the process when selecting between multiple equal cost paths at the end points (as shown in FIG. 4) and at the intermediate points (as shown in FIGS. 5A-5B)

In addition to finding diverse paths at the end-points, it is important that any paths found by intermediate nodes be congruent with the diverse paths selected by the end-points. FIGS. 5A-5B and 6 are provided to show that the path segments selected by the intermediate nodes are congruent with the diverse paths selected by the end-points.

As explained above, in the illustrated embodiment, the initial path ranking enabled a first pair of paths 1248 and 1578 to be selected between nodes 1 and 8. Renaming the links and reordering the paths with the renamed links resulted in a second set of paths 1258 and 1348 to be selected between nodes 1 and 8. These selected paths are listed in FIG. 6.

According to an embodiment, each intermediate node performs the same process that was performed by the end points 1 and 8. However, the node will substitute itself in as the end-point of the path so that the intermediate node will use the calculation to select a plurality of paths between itself and the intended end-point. Thus, each node 4 and 5 will determines a set of equal cost paths to the destination, ranking the paths, selecting high and low, re-naming the links, re-ranking the paths, and once again selecting the high and low ranked paths.

FIGS. 5A and 5B show the result of this process for intermediate node and intermediate node 4. As shown in FIG. 5A, intermediate node 5 will find equal cost paths 258, 358, and 578 to node 8. Naming the links along these paths using concatenated endpoint node IDs results in a set of links shown in box 120. Namely, path 258 has a path ID including links 2-5 and 5-8; path 358 has a path ID including links 3-5 and 5-8; and path 578 has a path ID including links 5-7 and 7-8. These paths will be ranked as shown and the highest and lowest will be selected. The links will then be renamed by inverting the high node ID as shown in box 122. The order of the links will then be re-adjusted to order the link IDs in ascending order (lowest link IDs first), and the new path IDs will be re-ranked. Once again the highest and lowest path IDs in the list will be selected which, in this instance, are the same as the initial set of paths. Thus, intermediate node 5 will select path 578 and 258 using this process which is congruent with the set of selected paths from 1 to 8 that passed through node 5. Specifically, as shown in FIG. 6, the process selected paths 1248, 1578, 1258 and 1348 when implemented for selection of a path from node 1 to node 8. Two of these paths passed through node 5—1578 and 1258. When the process was implemented at node 5, node 5 likewise selected 578 and 258 so that the intermediate node selected paths that are congruent with the end-to-end path selection.

FIG. 5B shows the same process for intermediate node 4. As shown in boxes 126, 128 and 130, and as shown in box 132 of FIG. 6, node 4 will select path 248 and 348 which are congruent with the two paths selected during the end-to-end selection process. Thus, intermediate results using the process described above are congruent with the end-to-end results. Similar calculations can be performed to show that the reverse path selection process—from node 8 to node 1—also results in the same set of selected paths. Likewise, it can be shown that paths between other sets of nodes, such as between node 9 and node 8 are acyclic/planar with the paths between nodes 1 and 8.

In the previous examples, after ranking the paths and selecting the low and high paths, the links were renamed by inverting the high node ID. Optionally, this may be done a second time, for example by inverting the low node ID as well. In this embodiment, the after renaming the link IDs (106), reconstructing path IDs from the renamed links (110), reordering the paths (114) and taking the low and high paths (118) the process could iterate to rename the original link IDs again using a different renaming convention. As an example, the low node ID could be inverted during this iteration. After the second re-naming process, the other steps of reconstructing path IDs from the renamed links (110), reordering the paths (114) and taking the low and high paths (118) would be implemented to select an additional set of paths.

It is generally desirable to avoid network administration if possible. However, randomly assigned node IDs in the network may, at times, fail to adequately exploit the full amount of available diversity on the network, especially if the number of path permutations at a given level of hierarchy in the network is greater than four. According to an embodiment of the invention, selectively adjusting particular node IDs in the network, when used in combination with the path selection process described above, may enhance the amount of diversity achieved when selecting between equal cost paths.

In the process described above, when link IDs are created by concatenating node IDs with the lowest node first and the highest node second, the lowest node ID will be included in the most significant bits of the link ID with the highest node ID included in the least significant bits of the link ID. Accordingly, inverting the highest node ID will have less effect on the link ID value since it will affect the least significant bits of the link ID. Thus, where the lowest node ID is selected as part of a path between a pair of nodes, it is likely that the renaming process described above will also select a second path that also passes through the same node.

This property may be exploited such that, if the structure of the network is known, selective adjustment of node ID values can cause the algorithm to choose paths that transit a desired node on the network. Thus, by administratively setting at least some of the node IDs, the administrator can select key waypoints which paths will transit on the network. Likewise, by selecting a particular node ID inversion function, the administrator can force the paths to go through particular nodes, so that using different inversion functions can cause different path selection processes to pass through different nodes and become link diverse at those nodes on the network. This inversion function is applied uniformly to all Node Ids in the network to select waypoints. The link naming and renaming procedures described earlier are then applied in turn to the paths created by each node ID inversion function, the effect being to select different end to end paths which transit the waypoint selected by the current node ID inversion function.

Figure 7:
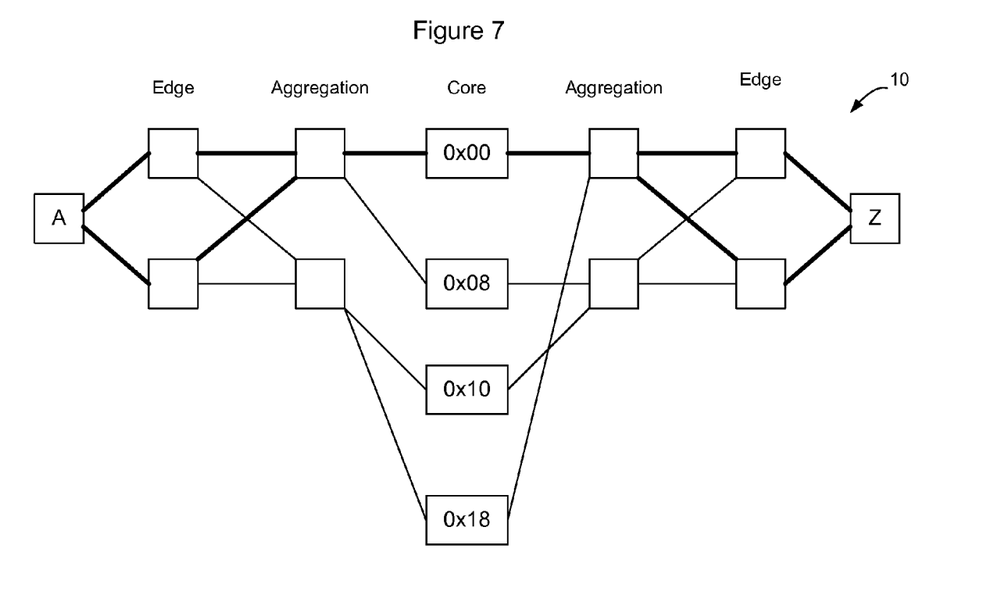
FIGS. 7-8 show how manipulation of the inversion function, in combination with administrative assignment of node IDs, may be used to adjust path selection on a network according to an embodiment of the invention.
Figure 8:
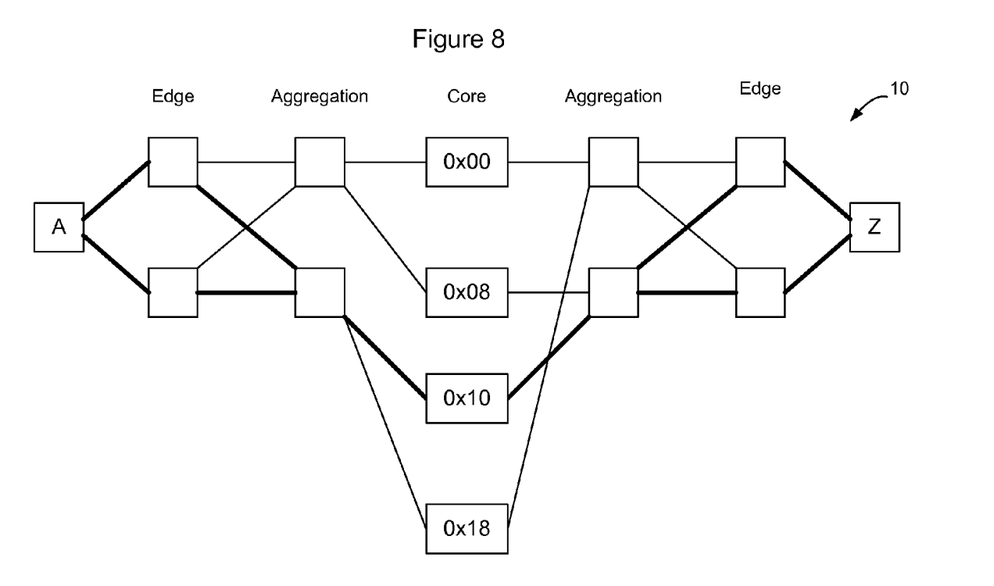

FIGS. 7 and 8 show application of the path selection process using different node ID inversion functions to cause path selection to selectively traverse a selected one of the core nodes. Specifically, in FIG. 7 the core nodes were assigned node IDs 0x00, 0x08, 0x10, and 0x18. Different path selection processes described above were then implemented using different inversion functions applied uniformly to all Node Ids prior to forming the link names. For example, the inversion function used to rename the links may cause the node IDs to be XORed with 0x00, 0x08, 0x10, and 0x18 in turn, or other values. Using the first inversion function will cause a path to be selected that passes through the top core node as shown in FIG. 7, because its Nodal Id has the value zero, which makes all links attached to it have a low Node Id of zero, and hence guaranteed to be selected when ranking path Ids. Adjusting the inversion function to cause the node IDs to be XORed with a different value will cause the selected paths to go through a different core node, for example as shown in FIG. 8 which is the consequence of XORing the node IDs with 0x10. Accordingly, knowledge of the structure of the network and selective application of an inversion function to all nodes during the initial link naming process enables the administrator to select a core node through which the paths will transit. Hence, it is possible to cycle through the core nodes and force path selection processes to utilize each of the core nodes to better spread traffic within the network so that all of the core nodes are used. After the initial core node is selected using this initial node ID inversion process, the links may be renamed as described above by uniformly applying a second function to one of the node IDs of each link to enable a second path selection process to occur. This node ID inversion process is thus applied with the previously described link renaming process running as an "inner loop", in order to select in turn the multiple paths available through different Edge nodes but a common core node, as shown in FIGS. 7 and 8.

Figure 9:
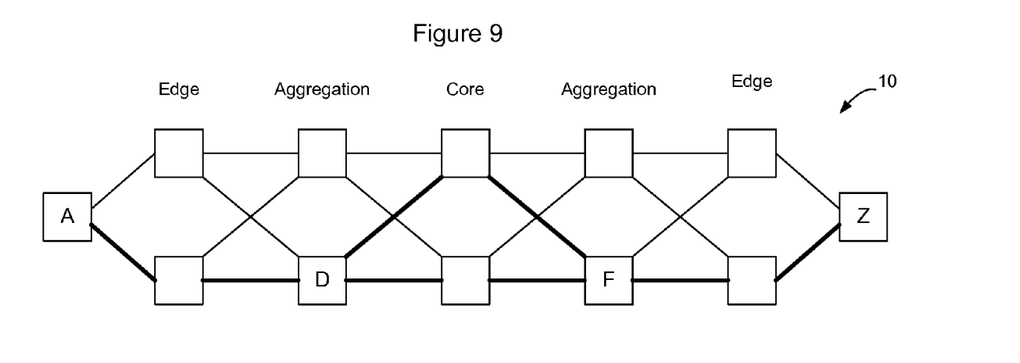
FIGS. 9-10 show how manipulation of node IDs may be used to force selection of link diverse paths by causing the edge node to be the tie-breaking point on a network according to an embodiment of the invention.

Another way to administratively adjust how path selection is implemented on the network is to assign node IDs from different ranges. FIG. 9 shows an example where all of the nodes are assigned numbers from the same range. In FIG. 9, it is assumed that equal cost paths are being computed from node A to node Z. In this example, intermediate nodes D and F have low node ID values and, hence, will form the location where paths diverge on the network. This is because one or other of D and F will have the lowest link Id (on the basis of its low Node Id component). If the first path selected passes through the top core node, because its Node Id is lower than the bottom core node, then after the link renaming inversion process the link through the bottom core node will have the lowest Node Id.

Figure 10:
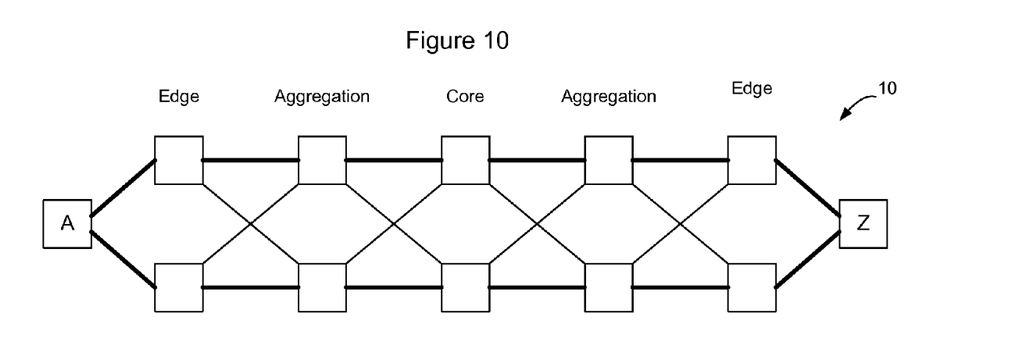

FIG. 10 shows another example where the outside nodes connecting to the network (nodes A and Z in FIG. 10) are assigned node ID values from a different range than the nodes on the network. Specifically, in FIG. 10 nodes A and Z have been assigned node ID values using numbers between 1 and 1023. The edge, aggregation, core nodes, etc. have then been assigned numbers from a different, higher, range such as between 1025 and 2047. Of course, other ranges may be used as well and these ranges are merely intended to provide an example.

By assigning low node ID values to the nodes that connect to the network and high node ID values to the other nodes on the network, the node that connects to the network may be selected as the pivot point where the selected equal cost paths diverge. Thus, for example as shown in FIG. 10, link diverse paths are made to be selected at the nodes that connect to the network and, hence, the nodes that connect to the network may spread traffic across multiple access links if dual homed to the network. Additionally, since both A and Z have been assigned low node ID values, this path divergence will occur at both A and at Z, so that both A and Z are guaranteed to have link diverse alternate equal cost paths connecting to the network. Additionally, although the paths may converge within the network, there is a good chance that the paths will remain link diverse throughout the network such as the example shown in FIG. 10.

Thus, administratively adjusting the node ID values can cause paths selected using the process described above to occur at a particular location on the network. This enables the administrator to intentionally spread traffic around the network by causing diverse path selection to occur at particular locations within the network and, hence, to cause path selection to occur in a manner that is more optimal from a traffic distribution standpoint. Further, since the node IDs are assigned from separate ranges when using this technique, not individually, the administrative burden is relatively minimal since the precise selection of the node IDs within the ranges is not critical to cause traffic patterns such as the traffic pattern shown in FIG. 10 to develop, and unique node IDs within a range can be auto-allocated by a number of well-known techniques. As long as the nodes connecting to the network are selected from a different (lower) range than the node IDs assigned to the rest of the network nodes, the initial path divergence from nodes A and Z will occur as shown in FIG. 10.

This administrative assignment of nodes to use specific ranges of node IDs may beneficially be combined with the technique of assigning node IDs to key waypoint nodes and using the nodal ID inversion function described earlier. The waypoint selection process allows the high level selection of routes through the core to be controlled, and the administrative assignment of ranges to the other nodes can be used to maximize the opening of link-diverse end-to-end paths transiting the selected waypoints.

The functions described above may be implemented as a set of program instructions that are stored in a computer readable memory and executed on one or more processors on the computer platform. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense.

What is claimed is:

1. A method of selecting between multiple equal cost paths in a communication network, the method comprising:

determining a set of equal cost paths between a pair of nodes on a communication network, each path comprising at least one link;

constructing a first link identifier for each link of the at least one link on each of the equal cost paths, each of the first link identifiers being created by concatenating ordered node identifiers of nodes that connect to the link on the communication network;

constructing a first path identifier for each of the equal cost paths, each of the first path identifiers being created by concatenating first link identifiers of the at least one link forming the respective path through the communication network;

ranking the first path identifiers in a path-independent manner to select a first set of diverse paths through the communication network;

constructing a second link identifier for each link of the at least one link on the equal cost paths, each of the second link identifiers being created by concatenating a node identifier of one of the nodes that connect to the each link on the communication network with an inverted node identifier of other of the nodes that connect to the each link on the communication network, the node identifiers being concatenated to form the respective second link identifiers in the same order as determined when constructing the first link identifiers;

constructing a second path identifier for each of the equal cost paths, each of the second path identifiers being created by concatenating second link identifiers of the at least one link forming the respective equal cost path through the communication network; and ranking the second path identifiers in a path-independent manner to select a second set of diverse paths through the communication network.

2. The method of claim 1, wherein the concatenated ordered node identifiers used to form the first link identifiers are ordered such that a low node identifier forms the most significant bits of the first link identifier and a high node identifier forms the least significant bits of the first link identifier.

3. The method of claim 1, wherein constructing the first path identifiers comprises sorting the first link identifiers so that the order in which the first link identifiers appear within the first path identifiers is path-independent.

4. The method of claim 1, wherein constructing the first path identifiers comprises sorting the first link identifiers from lowest to highest.

5. The method of claim 1, wherein ranking the first path identifiers comprises ordering the first path identifiers from lowest to highest.

6. The method of claim 5, wherein the first set of diverse paths through the communication network comprise the path with the lowest ranked first path identifier and the path with the highest ranked first path identifier.

7. The method of claim 1, wherein constructing the second link identifiers comprises applying an identical inversion function to one of the node identifiers of each of the links to create the inverted node identifiers.

8. The method of claim 7, wherein the identical inversion function is an exclusive OR (XOR) function.

9. The method of claim 7, wherein the concatenated ordered node identifiers used to form the second link identifiers are ordered such that a low node identifier forms the most significant bits of the second link identifier and a high node identifier forms the least significant bits of the second link identifier, and wherein the identical inversion function is applied to the high node identifier.

10. The method of claim 1, wherein constructing the second path identifiers comprises sorting the second link identifiers so that the order in which the second link identifiers appear within the second path identifiers is path-independent.

11. The method of claim 1, wherein the second link identifiers are ordered from lowest to highest prior to concatenation when forming the second path identifiers.

12. The method of claim 1, wherein ranking the second path identifiers comprises ordering the second path identifiers from lowest to highest.

13. The method of claim 12, wherein the second set of diverse paths through the communication network comprise the path with the lowest ranked second path identifier and the path with the highest ranked second path identifier.

14. The method of claim 1, further comprising applying a first inversion function to all node identifiers before creating the first link identifiers and the second link identifiers to preferentially select a transit node on the communication network through which the first set of diverse paths will pass.

15. The method of claim 14, wherein constructing the second link identifiers comprises applying a second inversion function to one of the nodes identifiers of each of the links to create the inverted node identifiers to enable the second set of diverse paths to be selected that pass through the transit node and diverge away from the transit node.

16. A method of operating a communication network, the communication network comprising a plurality of nodes interconnected by links, the method comprising, at each node:

implementing a link state routing protocol process to enable the node to exchange network configuration information with other nodes on the communication network and to calculate paths through the communication network; and for each set of equal cost paths between a pair of nodes on the communication network, each path comprising at least one link:

constructing a first link identifier for each link of the at least one link on each of the equal cost paths, each of the first link identifiers being created by concatenating ordered node identifiers of nodes that connect to the link on the communication network;

constructing a first path identifier for each of the equal cost paths, each of the first path identifiers being created by concatenating the first link identifiers of the at least one link forming the respective equal cost path through the communication network;

ranking the first path identifiers in a path-independent manner to select a first set of diverse paths through the communication network;

constructing a second link identifier for each link of the at least one link on the equal cost paths, each of the second link identifiers being created by concatenating a node identifier of one of the nodes that connect to the each link on the communication network with an inverted node identifier of other of the nodes that connect to the each link on the communication network, the node identifiers being concatenated in the same order as determined when constructing the first link identifiers;

constructing a second path identifier for each of the equal cost paths, each of the second path identifiers being created by concatenating the second link identifiers of the at least one link forming the respective equal cost path through the communication network; and ranking the second path identifiers in a path-independent manner to select a second set of diverse paths through the communication network.

17. The method of claim 16, wherein each node identifier is administratively assigned from separate ranges of node identifiers according to node classification to enable the first set of diverse paths and the second set of diverse paths to diverge at selected locations of the communication network.

18. The method of claim 17, wherein nodes on an edge of the communication network are assigned node identifiers from a low range and nodes on the interior of the communication network are assigned node identifiers from a high range, to cause the first set of diverse paths and the second set of diverse paths to be link-diverse at the edge of the communication network.

19. The method of claim 16, wherein constructing the second link identifiers comprises applying an identical inversion function to one of the node identifiers of each of the links to create the inverted node identifiers.

20. The method of claim 19, wherein the concatenated ordered node identifiers used to form each of the second link identifiers are ordered such that a low node identifier forms the most significant bits of the respective second link identifier and a high node identifier forms the least significant bits of the respective second link identifier, and wherein the identical inversion function is applied to the high node identifier.

21. The method of claim 16, wherein node identifiers of transit nodes are administratively assigned so that the transit nodes become in turn transit points during successive repetitions of the construction of the first link identifiers and the second link identifiers.

22. The method of claim 21, wherein selective inversion functions chosen to match the administratively assigned node identifiers of the transit nodes are serially applied to all node identifiers during iterations of the steps of creating the first link identifiers and the second link identifiers, creating the first path identifiers and the second path identifiers, and ranking the first path identifiers and the second path identifiers, to cause different paths to be selected through each assigned transit node on the communication network in turn during the iterations.

23. The method of claim 22, wherein the selective inversion function is an exclusive OR (XOR) function.

* * * * *